US008071192B2

(12) United States Patent
Kornfalt et al.

(10) Patent No.: US 8,071,192 B2
(45) Date of Patent: Dec. 6, 2011

(54) FLOORING SYSTEM WITH A PLURALITY OF DIFFERENT DECORATIVE UPPER SURFACES

(75) Inventors: Sven Kornfalt, Malmo (SE); Peter Ringo, Skurup (SE); Anja Lindstedt, Vellinge (SE); Kent Akerman, Trelleborg (SE)

(73) Assignee: Pergo AG, Baar (CH)

(*) Notice: Subject to any disclaimer, the term of this patent is extended or adjusted under 35 U.S.C. 154(b) by 680 days.

(21) Appl. No.: 10/581,261

(22) PCT Filed: Nov. 16, 2004

(86) PCT No.: PCT/SE2004/001666
§ 371 (c)(1),
(2), (4) Date: Jul. 11, 2006

(87) PCT Pub. No.: WO2005/056288
PCT Pub. Date: Jun. 23, 2005

(65) Prior Publication Data

US 2007/0059543 A1 Mar. 15, 2007

(30) Foreign Application Priority Data

Dec. 11, 2003 (SE) ....................................... 0303344

(51) Int. Cl.
*B32B 3/10* (2006.01)
*B32B 27/08* (2006.01)

(52) U.S. Cl. ................ 428/58; 52/177; 52/390; 428/44; 428/53; 428/57; 428/60; 428/98; 428/192; 428/213; 428/220; 428/502

(58) Field of Classification Search .................... 428/44, 428/53, 57, 58, 60, 98, 192, 213, 220, 502; 52/177, 390
See application file for complete search history.

(56) References Cited

U.S. PATENT DOCUMENTS

| | | | | |
|---|---|---|---|---|
| 3,811,237 | A * | 5/1974 | Bettinger | 52/126.6 |
| 5,271,200 | A | 12/1993 | Witt | |
| 6,375,777 | B1 * | 4/2002 | Sjolin et al. | 156/209 |
| 6,397,547 | B1 * | 6/2002 | Martensson | 52/582.1 |
| 6,465,046 | B1 * | 10/2002 | Hansson et al. | 427/256 |
| 2002/0007609 | A1 * | 1/2002 | Pervan | 52/590.2 |
| 2003/0167717 | A1 | 9/2003 | Carcia | |
| 2004/0170812 | A1 * | 9/2004 | Sjoberg | 428/195.1 |
| 2005/0115181 | A1 * | 6/2005 | Grau | 52/390 |

FOREIGN PATENT DOCUMENTS

| | | | |
|---|---|---|---|
| WO | WO 02/47806 | * | 6/2002 |
| WO | WO 03060256 A1 | * | 7/2003 |

OTHER PUBLICATIONS

Don Bollinger, Mixing It Up, Aug./Sep. 2003, Hardwood Floors, pp. 49-50,52-55.*
WO 03/060256 (See advisory action.).*

* cited by examiner

*Primary Examiner* — Brent O'Hern
(74) *Attorney, Agent, or Firm* — Novak Druce + Quigg LLP

(57) ABSTRACT

A flooring system comprising a carrying panel with edges, said edges being provided with means for joining. The carrying panel is further being provided with an upper side and a lower side. The flooring system comprises a plurality of panels where each panel is provided with an upper decorative surface. The flooring system comprises panels with at least two of decorative surface selected from the group consisting of a thermosetting composite, a thermoplastic composite, an elastomeric foil, a thermoplastic foil, a metal sheet, a fabric, a mineral and a mineral composite.

4 Claims, No Drawings

FLOORING SYSTEM WITH A PLURALITY OF DIFFERENT DECORATIVE UPPER SURFACES

This application is a 35 USC §371 U.S. National Stage Application of International Application No. PCT/SE2004/001666, filed on Nov. 16, 2004, claiming the priority of Swedish Patent Application No. 0303344-6, filed Dec. 11, 2003, the entire disclosures of which are incorporated herein by reference in their entireties.

The present invention relates to a flooring system with a plurality of panels where the top surface is provided with a decorative surface having different material properties.

There is a number of different flooring materials known on the market today. As an example of these materials can be mentioned; wood, carpets, ceramic tiles, minerals like marble, vinyl mats, lacquer systems, rubber tiles and different types of laminate. It is of course most common to install only one of these materials per room, however, there is a need to able to combine different materials of both aesthetical and mechanical property reasons. It is however rather difficult to achieve such combinations as these different materials most often have different thickness and mechanical property as well as different methods for joining them to the subfloor. It will therefore be very costly and awkward to make these combinations of materials. It would be very advantageous if such combination where easier to make.

The above mentioned desires have been met through the present invention. Accordingly, the present invention relates to a flooring system comprising a carrying panel with edges. The edges are provided with means for joining. The carrying panel is further provided with an upper side and a lower side. The invention is characterised in that the flooring system comprises a plurality of panels where each panel is provided with an upper decorative surface where the flooring system comprises panels with at least two of the decorative surfaces selected from the group consisting of; a thermosetting composite, a thermoplastic composite, an elastomeric foil, a thermoplastic foil, a metal sheet, a fabric, a mineral and a mineral composite.

The edges are suitably provided with snap-joining functionality. There are several such snap-joined joints known on the market today. Snap joining will facilitate the assembly. The edges may also be provided with pre-applied glue in order to facilitate assembly where glued joints are desired. It is also possible to utilise a traditional tongue and groove joint which is glued.

According to one embodiment of the invention the thermosetting composite comprises cellulose and amino resin. The cellulose may be present in the form of a sheet impregnated with the resin or a resin/cellulose slurry. It is also possible to use a wood veneer, which then will carry the decorative part of the panel. The decor may also be carried of a cellulose sheet. The amino resin is suitably selected from the group consisting of; melamine-formaldehyde resin, urea-formaldehyde resin and mixtures thereof. The thermosetting composite suitably further comprises hard particles selected from the group consisting of; aluminium oxide, silicon oxide and silicon carbide, the particles having an average particle size in the range 50 nm-150 μm, in order to increase the wear resistance. The described surface layer is also known as thermosetting laminate which is known for its wear resistance and is also highly resistive to most household chemicals. The thermosetting laminate is also very easy to keep clean as the surface is very hard. The thermosetting laminate can be provided with almost any decor one may think of, however the most common decors are different kinds of wood, minerals like marble and granite as well as ceramic tiles.

The flooring system may also incorporate panels with a decorative surface comprising a thermoplastic composite. The thermoplastic composite suitably comprises thermoplastic materials selected from the group consisting of; polyvinyl chloride, ionomeric ethylene methacrylic acid copolymer, polyethylene, polypropylene, polybutene and polycarbonate.

The flooring system may also incorporate panels with a decorative surface comprising a thermosetting composite comprising a radiation curing resin. Also the thermosetting composite suitably comprises hard particles selected from the group consisting of; aluminium oxide, silicon oxide and silicon carbide, the particles having an average particle size in the range 50 nm-150 μm.

The flooring system may also incorporate panels with a decorative surface comprising an elastomeric foil which is selected from the group consisting of; thermoplastic elastomers, synthetic rubber and natural rubber. Such a foil may be used in areas with high traffic where for example sound dampening is desired. The elastomeric foil may also be provided with any desired surface structure. It will for example be possible to install a floor where the intended walkways have a rubber surface while the rest of the floor have a simulated exclusive high gloss wood design constituted of an, easy to clean, thermosetting laminate. It is also possible to add special physical properties in special areas as for example on a floor area close to door where for example carbon may be included in the surface for gradually lowering the electrical potential in a person walking on it. This will reduce the risk for the unpleasant sudden discharge when touching the door handle. Since all panels within the system have the same edge joining system the installation will be easy to achieve.

The flooring system may also incorporate panels with a decorative surface comprising a thermoplastic foil which is selected from the group consisting of; polyvinyl chloride, ionomeric ethylene methacrylic acid copolymer, polyethylene, polypropylene, polybutene and polycarbonate.

The flooring system may also incorporate panels with a decorative surface comprising a metal sheet which is selected from the group consisting of; aluminium foil, steel foil, copper foil, zinc foil, titanium foil and alloys therefrom.

All of the different decorative surfaces made of thermosetting, thermoplastic, elastomeric and metal surfaces with their respective differences in physical properties may all be provided with a surface structure. They may further be provided with decor achieved through coloration either in a uniform coloration or a patterned design. Some materials have properties that makes them natural for simulating certain materials. For example thermosetting laminate, most commonly being constituted by a printed paper and possibly one or more overlay papers for wear resistance where the papers are impregnated with amino resin, is very suited for simulating materials like wood, polished and planed stone and ceramic materials. The metal surface can be provided with a surface structure and be used as it is. The same goes for the rubber material which also can be provided with a surface structure. The fabric can be exemplified by needle loom carpets. The materials may be selected by mere design expression or for their unique physical properties It will through the present invention be very easy to create very interesting interior designs as easy as installing a common laminate floor. The different materials may be selected by mere design expression or for their unique physical properties.

The invention claimed is:

1. A flooring system comprising a plurality of panels, at least one panel differing in at least one of aesthetic or mechanical properties from another panel of said system, each panel provided with edges, said edges being provided with means for joining, said panel further being provided with an upper side and a lower side wherein the flooring system comprises a plurality of panels where each panel is provided with an upper decorative surface and that the flooring system comprises panels with at least two of the decorative surfaces of the flooring system selected from the group consisting of a thermosetting composite, a thermoplastic composite, an elastomeric foil, a thermoplastic foil, a metal sheet, a fabric, a mineral and a mineral composite wherein at least one of the panels comprises a decorative surface comprising a thermosetting composition and at least one other panel of the flooring system comprises a decorative surface of elastomeric foil.

2. A flooring system comprising a plurality of panels, at least one panel differing in at least one of aesthetic or mechanical properties from another panel of said system, each panel provided with edges, said edges being provided with means for joining, said panel further being provided with an upper side and a lower side wherein the flooring system comprises a plurality of panels where each panel is provided with an upper decorative surface and that the flooring system comprises panels wherein at least a portion of the panels comprise an elastomeric foil as the decorative surface while the rest of the panels have a high-gloss wood design of thermosetting composite.

3. A flooring system comprising a plurality of panels, the panels comprising a carrying panel provided with edges, said edges being provided with means for joining, said carrying panels further being provided with an upper side and a lower side wherein the flooring system comprises a plurality of panels where each carrying panel is provided with an upper decorative surface on the upper side of the carrying panel and that the flooring system comprises panels having at least two of the decorative surfaces of the carrying panels being different with one consisting of a thermosetting composite and with another independently consisting of a decorative material selected from the group consisting of a thermosetting composite, a thermoplastic composite, an elastomeric foil, a thermoplastic foil, a fabric, a mineral and a mineral composite; wherein the elastomeric foil is selected from the group consisting of thermoplastic elastomers, synthetic rubber and natural rubber, wherein the remainder of the floor comprises panels having a decorative surface of thermosetting laminate in the form of a high-gloss wood design.

4. A flooring system comprising a plurality of panels, the panels comprising a carrying panel provided with edges, said edges being provided with means for joining, said carrying panel further being provided with an upper side and a lower side wherein the flooring system comprises a plurality of panels where each carrying panel is provided with an upper decorative surface on the upper side of the carrying panel and that the flooring system comprises panels having at least two of the decorative surfaces being different from each other and independently consisting of a decorative material selected from the group consisting of a thermosetting composite, a thermoplastic composite, an elastomeric foil, a thermoplastic foil, a fabric, a mineral and a mineral composite, wherein the fabric comprises a needle loom carpet; and, wherein the floor also comprises an elastomeric foil.

* * * * *